United States Patent
Oh (10) Patent No.: US 11,945,280 B2
(45) Date of Patent: Apr. 2, 2024

(54) INTEGRATED THERMAL MANAGEMENT MODULE FOR A VEHICLE

(71) Applicants: HYUNDAI MOTOR COMPANY, Seoul (KR); KIA CORPORATION, Seoul (KR)

(72) Inventor: Man Ju Oh, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 35 days.

(21) Appl. No.: 17/737,462

(22) Filed: May 5, 2022

(65) Prior Publication Data
US 2023/0124627 A1     Apr. 20, 2023

(30) Foreign Application Priority Data

Oct. 15, 2021   (KR) .......................... 10-2021-0137703

(51) Int. Cl.
*B60H 1/00* (2006.01)

(52) U.S. Cl.
CPC ............... *B60H 1/00028* (2013.01); *B60H 2001/00178* (2013.01)

(58) Field of Classification Search
CPC ............. B60H 1/00028; B60H 1/3229; B60H 1/00207; B60H 1/00392; B60H 2001/00178; B60H 2001/00214; B60H 2001/00221
See application file for complete search history.

(56) References Cited

U.S. PATENT DOCUMENTS

| | | | |
|---|---|---|---|
| 6,557,772 B1 | 5/2003 | Pettigiani et al. | |
| 7,748,441 B2 * | 7/2010 | Litwing | B60H 1/00521 165/204 |
| 11,192,425 B2 | 12/2021 | Oh et al. | |
| 2011/0284298 A1 | 11/2011 | Ajisaka | |

(Continued)

FOREIGN PATENT DOCUMENTS

| | | | |
|---|---|---|---|
| CN | 10808910 A | * | 5/2018 |
| CN | 108081910 A | | 5/2018 |

(Continued)

OTHER PUBLICATIONS

Office Action dated Jun. 5, 2023 cited in corresponding U.S. Appl. No. 17/730,446; 21 pp.

*Primary Examiner* — Marc E Norman
(74) *Attorney, Agent, or Firm* — Lempia Summerfield Katz LLC (57) ABSTRACT

A thermal management module for a vehicle includes: a housing disposed on a cross member between side frames arranged on both sides of an underbody of the vehicle on which wheels and a drive unit are positioned; a cooling/heating heat exchanger; an outdoor heat exchanger; a refrigerant storage; and a refrigerant circulation part. The housing includes a cooling/heating duct connected to an upper body of the vehicle, and a heat exchanging duct connected to the outside of the vehicle. The cooling/heating heat exchanger and the outdoor heat exchanger are disposed on the cooling/heating duct and the heat exchanging duct of the housing. The refrigerant storage and the refrigerant circulation part are provided on sides of the cooling/heating duct and the heat exchanging duct of the housing.

10 Claims, 4 Drawing Sheets

(56) References Cited

U.S. PATENT DOCUMENTS

2020/0377002 A1    12/2020  Tezza, II
2021/0053415 A1     2/2021  Oh et al.
2023/0120222 A1*    4/2023  Oh .................... B60H 1/00457
                                                                165/202

FOREIGN PATENT DOCUMENTS

CN        113602057  A    11/2021
KR      20210022220  A     3/2021
KR      20220012512  A     2/2022

* cited by examiner

INTEGRATED THERMAL MANAGEMENT MODULE FOR A VEHICLE

CROSS REFERENCE TO RELATED APPLICATION

This application claims priority to and the benefit of Korean Patent Application No. 10-2021-0137703, filed Oct. 15, 2021, the entire contents of which are incorporated herein by reference.

BACKGROUND

Field

The present disclosure relates to an integrated thermal management module for a vehicle.

Description of the Related Art

Recently, the number of eco-friendly vehicles registered in the Republic of Korea has been increasing, due to combination of the eco-friendly vehicle promotion policy and preference for high fuel-efficiency vehicles. An electric vehicle is a type of eco-friendly vehicle driven by an electric motor instead of an engine using petroleum fuel. Such an electric vehicle has a system in which the motor rotates using electricity stored in a battery to propel the vehicle. Advantageously, the electric vehicle does not discharge harmful substances, has little noise, and has high energy efficiency.

A vehicle using engine power has operated an indoor heating system using waste heat of the engine. However, an electric vehicle has no engine, and thus has a system operating a heater using electricity. Thus, when heating is performed, electricity in the battery is used and the travel distance of the electric vehicle is significantly reduced.

In addition, a battery module of an electric vehicle may maintain optimal performance and a long lifespan only when used in an optimal temperature environment. However, it is difficult to maintain the optimal temperature environment due to heat produced during driving and changes in the ambient temperature.

Unlike an internal combustion engine (ICE) vehicles, an electric vehicle does not require an engine or the like positioned in the front part of the vehicle, and thus the electric vehicle has higher space utilization than ICE vehicles. Furthermore, there is demand for the development of an integrated thermal management module for a vehicle, wherein.

The foregoing is intended merely to aid in the understanding of the background of the present disclosure, and is not intended to mean that the present disclosure falls within the purview of the related art that is already known to those having ordinary skill in the art.

SUMMARY

The present disclosure provides an integrated thermal management module for a vehicle. In particular, the integrated thermal management module is provided on the underbody of the vehicle on which wheels and a drive unit are positioned. The integrated thermal management module includes: a housing, a plurality of heat exchangers, a refrigerant storage, and a circulation part to perform a vehicle thermal management mode. The housing is disposed on a cross member between side frames on both sides of the underbody of the vehicle and provided with a cooling/heating duct and a heat exchanging duct.

According to one aspect of the present disclosure, a thermal management module for a vehicle may include: a housing disposed on a cross member between side frames on both sides of an underbody of a vehicle on which wheels and a drive unit are positioned, and including a cooling/heating duct connected to an upper body of the vehicle and a heat exchanging duct connected to the outside of the vehicle; a cooling/heating heat exchanger and an outdoor heat exchanger disposed on the cooling/heating duct and the heat exchanging duct of the housing; and a refrigerant storage and a refrigerant circulation part provided on sides of the cooling/heating duct and the heat exchanging duct of the housing.

The cross member may include a base extending in a lateral direction of the vehicle and coupling portions provided on ends of the base, the coupling portions being coupled to the side frames to connect the side frames to each other.

The housing may be disposed on a top region of the base of the cross member, and the coupling portions are bending parts of the ends of the base upward and outward of the vehicle so as to be supported on and coupled to side and top regions of the side frames, respectively.

The cooling/heating heat exchanger may include a vaporization core for indoor cooling and a condensing core for indoor heating. The vaporization core and the condensing core may be connected to a refrigerant line on which a compressor and an expansion valve are provided, such that refrigerant circulates.

The thermal management module may further include a mix door provided between the vaporization core and the condensing core to selectively open and close the vaporization core and the condensing core. When the mix door is closed, air that has passed through the vaporization core may bypass the condensing core to enter an indoor space of the vehicle. When the mix door is opened, air that has passed through the vaporization core may pass through the condensing core to enter the indoor space of the vehicle.

The outdoor heat exchanger may include a radiator in which coolant circulates and an outdoor condenser in which refrigerant circulates. The radiator may be connected to a coolant line through which the coolant circulates, and the outdoor condenser may be connected to a refrigerant line through which the refrigerant circulates.

The radiator and the outdoor condenser may be positioned in a flow path provided in an inside space of the heat exchanging duct. Air that has entered the flow path of the heat exchanging duct may exchange heat with the coolant or the refrigerant while passing through the radiator or the outdoor condenser.

The refrigerant storage may include a reservoir and an accumulator, and the refrigerant circulation part may include a chiller, a pump, a valve, and a compressor. The reservoir, the accumulator, the chiller, the pump, the valve, and the compressor may be integrated into a module so as to be positioned on sides of the cooling/heating duct and the heat exchanging duct.

The housing may be disposed on a cross member positioned in a front part of the vehicle. The cross member on which the housing is disposed may be positioned in front of front wheels of the vehicle.

The refrigerant storage and the refrigerant circulation part may be provided on sides of the cooling/heating duct and the heat exchanging duct to be positioned inside or outside the side frames of the underbody.

In another form of the present disclosure, the integrated thermal management module for a vehicle is provided on the underbody of the vehicle on which wheels and a drive unit are positioned, and includes a housing, a plurality of heat exchangers, a refrigerant storage, and a circulation part to perform a vehicle thermal management mode. The housing is disposed on a cross member between side frames on both sides of the underbody of the vehicle and provided with a cooling/heating duct and a heat exchanging duct.

According to the embodiments of the present disclosure, a compact configuration is provided by integrating components for an air conditioning system and a thermal management system into a module. According to this configuration, an indoor space inside of a vehicle may be maximized, fabrication costs may be reduced, and vehicle body strength and assembly strength may also be secured during a vehicle body design process.

BRIEF DESCRIPTION OF THE DRAWINGS

The above and other objectives, features, and other advantages of the present disclosure should be more clearly understood from the following detailed description when taken in conjunction with the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

When a component, device, element, or the like of the present disclosure is described as having a purpose or performing an operation, function, or the like, the component, device, or element should be considered herein as being "configured to" meet that purpose or to perform that operation or function.

Figure 1:
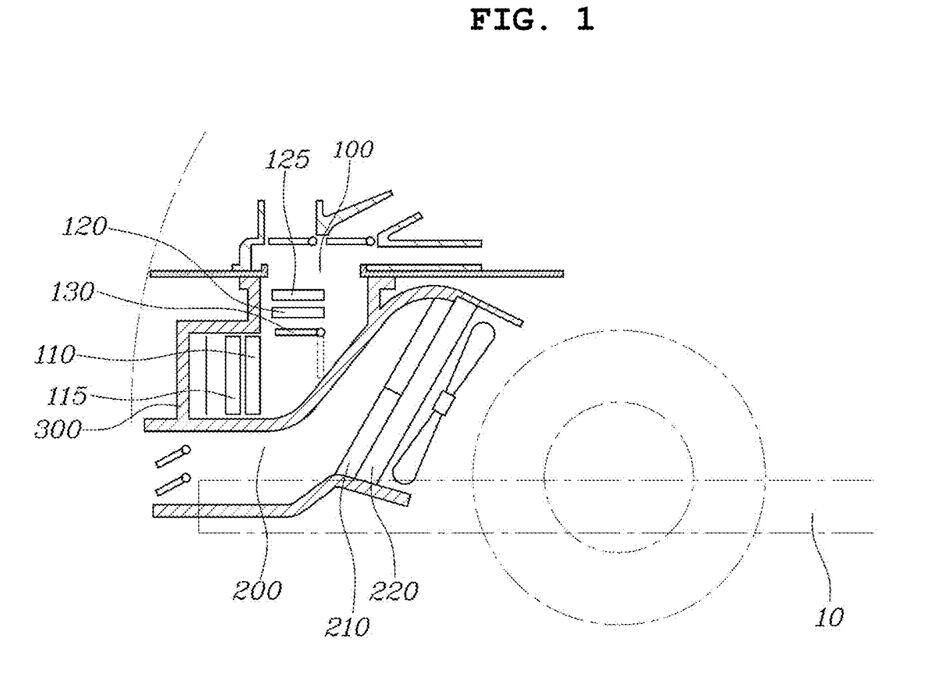
FIG. 1 is a side view illustrating an integrated thermal management module for a vehicle according to an embodiment of the present disclosure.
Figure 2:
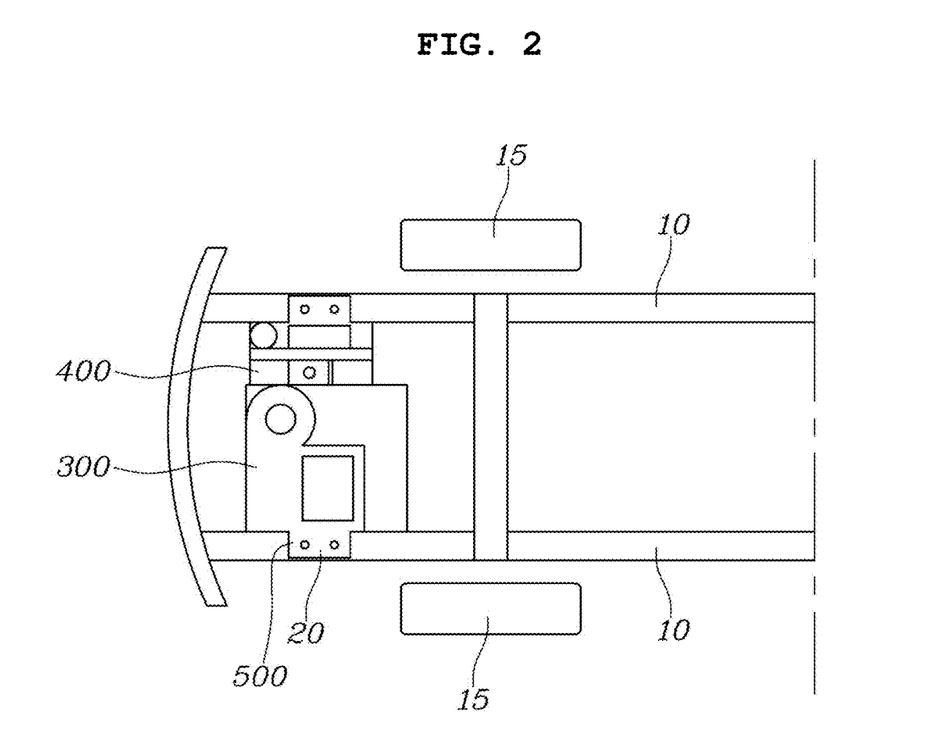
FIG. 2 is a schematic view illustrating the integrated thermal management module positioned in a front part of a vehicle according to an embodiment of the present disclosure.
Figure 3:
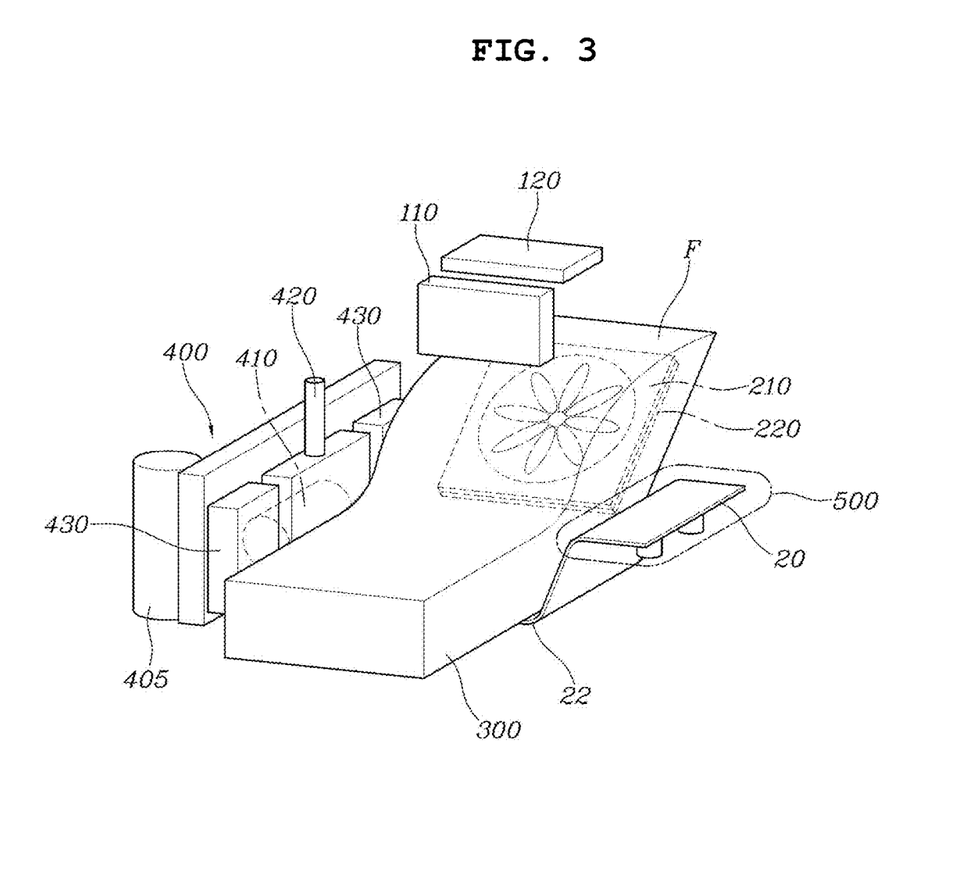
FIG. 3 is a perspective view illustrating the integrated thermal management module for a vehicle according to an embodiment of the present disclosure.
Figure 4:
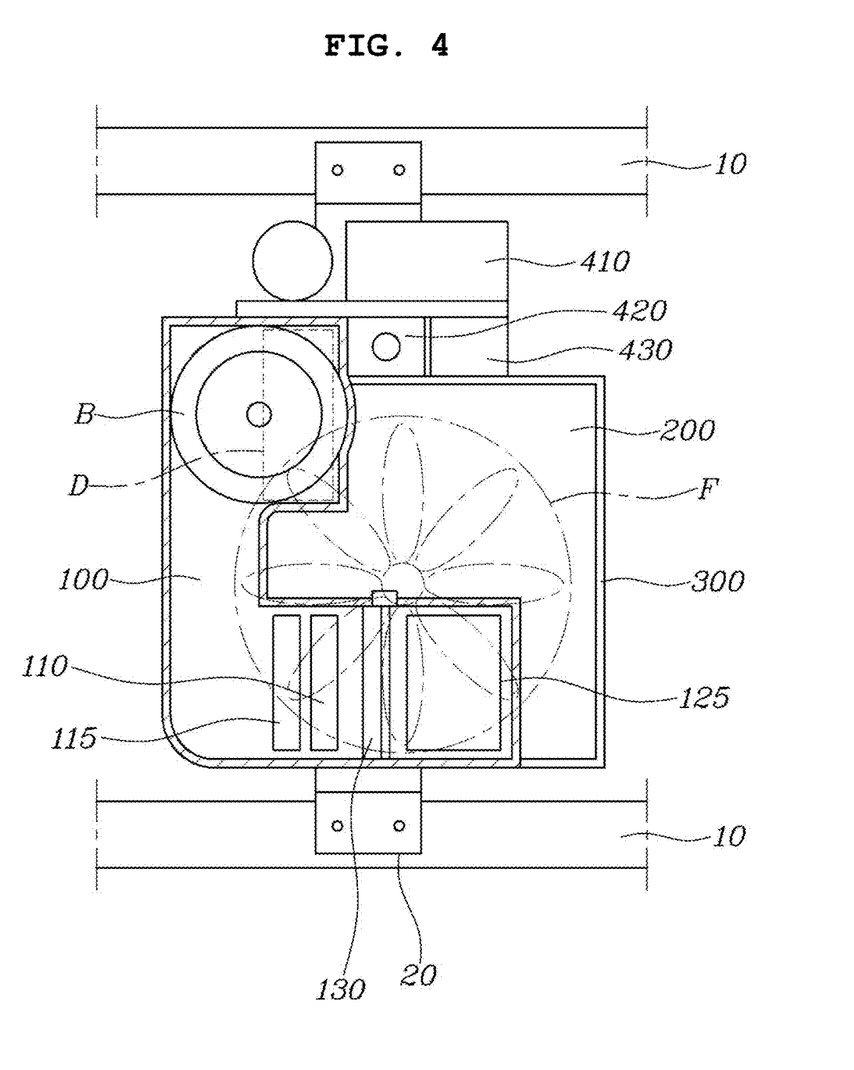
FIG. 4 is a plan view illustrating the integrated thermal management module for a vehicle according to an embodiment of the present disclosure.

FIG. 1 is a side view illustrating an integrated thermal management module for a vehicle according to an embodiment of the present disclosure, FIG. 2 is a schematic view illustrating the integrated thermal management module positioned in a front part of a vehicle according to an embodiment of the present disclosure, FIG. 3 is a perspective view illustrating the integrated thermal management module for a vehicle according to an embodiment of the present disclosure, and FIG. 4 is a plan view illustrating the integrated thermal management module for a vehicle according to an embodiment of the present disclosure.

FIG. 1 is a side view illustrating the integrated thermal management module for a vehicle. The integrated thermal management module is an integrated thermal management module provided on an underbody of the vehicle on which wheels 15 and a drive unit of the vehicle are positioned. In one embodiment, the integrated thermal management module includes: a housing 300, an outdoor heat exchanger, a refrigerant storage, and a refrigerant circulation part 400. The housing 300 is positioned between both side frames 10 of the vehicle underbody and disposed on a cross member 20 connecting the both side frames 10. A cooling/heating duct 100 connected to the vehicle upper body and a heat exchanging duct 200 connected to the outside of the vehicle are provided in the housing 300. The cooling/heating heat exchanger is positioned on the cooling/heating duct 100 of the housing 300. The outdoor heat exchanger is positioned on the heat exchanging duct 200. The refrigerant storage and the refrigerant circulation part 400 are provided on sides of the cooling/heating duct 100 and the heat exchanging duct 200.

The integrated thermal management module for a vehicle according to an embodiment of the present disclosure is advantageously applicable to electric vehicles, in particular, having a skateboard platform. The skateboard platform is a vehicle chassis including a drive module having the shape of a skateboard to form the vehicle underbody and a life module coupled on top of the drive module, the life module being based on the purpose of a purpose built vehicle (PBV). This structure has high space utilization, and thus there is an advantage in that the internal space of the vehicle can be easily configured as desired.

The integrated thermal management module for a vehicle according to an embodiment of the present disclosure is configured to operate in a heat management mode required for air conditioning of an electric vehicle, cooling and heating for a battery, an electric drive unit, and the like. The integrated thermal management module is compactly provided on the bottom of the vehicle underbody so as to increase the inside space of the vehicle. The integrated thermal management module is also disposed on the cross member 20 connecting the both side frames 10 to advantageously obtain coupling strength with respect to the vehicle body.

Because the thermal management module for a vehicle is provided on the drive module in the lower part of the vehicle instead of being provided on the life module in the upper part of the vehicle, it is significantly advantageous for the degree of freedom of design and for securing the space. When the thermal management module is disposed on the drive module, the space and assembly strength may be insufficient. To overcome this, respective components of the thermal management module according to the present disclosure are positioned compact. In addition, since the thermal management module is disposed on the cross member 20 in the lower part of the vehicle, the assembly strength may also be advantageously increased.

In another embodiment of the present disclosure, the housing 300 of the thermal management module may be divided into an upper part and a lower part. The upper part of the housing may serve to form the cooling/heating duct 100 communicating with the inside of the vehicle, while the lower part of the housing may serve to integrally form the heat exchanging duct 200 communicating with the outside of the vehicle. In addition, inside the upper part of the housing, a filter 115 and a vaporization core 110 for indoor cooling, and a PTC heater and a condensing core 120 for indoor heating, are positioned on the cooling/heating duct 100. Inside the lower part of the housing, a radiator 210, an outdoor condenser 220, and a radiator fan F may be positioned on the heat exchanging duct 200.

In addition, outside the housing 300, various components for flow and action of refrigerant and coolant are integrally fitted together into a module, which is attached to a side portion of the housing 300 in a side-by-side manner. The module may have an overall compact configuration with a small height so as to be fixedly positioned on top of the cross member 20. In this manner, the thermal management module having a small size and capable of being easily assembled, minimizing the use of refrigerant, and securing a sufficient level of strength may be provided.

FIG. 2 is a schematic view illustrating the integrated thermal management module positioned in a front part of a vehicle, and FIG. 3 is a perspective view illustrating the integrated thermal management module for a vehicle according to an embodiment of the present disclosure.

In the integrated thermal management module for a vehicle according to an embodiment of the present disclosure, the cross member 20 includes a base 22 extending in the lateral direction of the vehicle and coupling portions 500 provided on ends of the base 22. The coupling portions 500 are connected to the side frames 10, thereby connecting the both side frames 10 to each other.

In addition, in the integrated thermal management module for a vehicle according to an embodiment of the present disclosure, the housing 300 is disposed on the top surface of the base 22 of the cross member 20, and the coupling portions 500 are formed by bending the ends of the base upward and outward of the vehicle so as to be supported on and coupled to the side and top regions of the side frames 10.

In this manner, the cross member 20 on which the housing 300 is mounted has the bent shape to secure the space in which various components are to be disposed in a module. The cross member 20 may be connected to the both side frames 10 through the coupling portion 500, thereby being strongly coupled to the vehicle body. Accordingly, it is possible to improve the strength of the vehicle body and the assembly strength of the thermal management module while securing a position in which the thermal management module is to be disposed.

FIG. 3 is a perspective view illustrating the integrated thermal management module for a vehicle according to an embodiment of the present disclosure, and FIG. 4 is a plan view illustrating the integrated thermal management module for a vehicle according to an embodiment of the present disclosure. In the integrated thermal management module for a vehicle according to an embodiment of the present disclosure, the cooling/heating heat exchanger includes the vaporization core 110 for indoor cooling and the condensing core 120 for indoor heating. The vaporization core 110 and the condensing core 120 may be connected to a refrigerant line on which a compressor 410 and an expansion valve are provided, such that the refrigerant may circulate. The cooling/heating duct 100 includes an intake door D through which side internal air or ambient air enters the cooling/heating duct 100 and a blower fan B. The blower fan B directs the air drawn in from the side interior or the outside of the vehicle to pass through the vaporization core 110 or the condensing core 120 so as to be discharged to the inside or the outside of the vehicle.

In the present embodiment, a heat pump system of an electric vehicle is used and the condensing core 120 is used for indoor heating. However, the present disclosure is not limited to the heat pump system, the condensing core 120 for indoor air conditioning, or the like.

The thermal management module according to the present disclosure may be generally include a part through which refrigerant flows and a part through which coolant flows. Portions occupying greatest volumes in the respective parts may be the outdoor condenser 220 on the refrigerant side and the radiator 210 on the coolant side. Each of the two parts is configured to enable the refrigerant or the coolant flowing through the inside thereof to exchange heat with the ambient air outside the vehicle. For heat exchange with the air, the radiator fan F is provided. Each of the outdoor condenser 220, the radiator 210, and the radiator fan F is disposed in an assembled state, and has a significant height. Thus, as illustrated in FIG. 1, each of the outdoor condenser 220, the radiator 210, and the radiator fan F is disposed on the cross member 20 while being inclined at angles. This configuration may reduce the overall height of the front portion of the drive module, thereby maximizing the inside space of the front portion of the life module.

In addition, other systems for the refrigerant and the coolant may be disposed on the side remaining spaces of the outdoor condenser 220, the radiator 210, and the radiator fan F. Thus, all of the components of the thermal management module may be disposed on the cross member 20 so as to be compact and secure assembly strength.

In the integrated thermal management module for a vehicle according to an embodiment of the present disclosure, a mix door 130 configured to selectively open and close between the vaporization core 110 and the condensing core 120 is provided between the vaporization core 110 and the condensing core 120. When the mix door 130 is closed, the air that has passed through the vaporization core 110 bypasses the condensing core 120 to enter the inside space of the vehicle. When the mix door 130 is opened, the air that has passed through the vaporization core 110 may pass through the condensing core 120 to enter the inside space of the vehicle. In addition, the degree of opening of the mix door 130 may be controlled so that cooling air and heating air may be appropriately mixed to produce air having a suitable temperature to be supplied to the inside of the vehicle.

In addition, in the integrated thermal management module for a vehicle according to an embodiment of the present disclosure, the outdoor heat exchanger includes the radiator 210 in which the coolant circulates and the outdoor condenser 220 in which the refrigerant circulates. The radiator 210 may be connected to a coolant line through which the coolant circulates, and the outdoor condenser 220 may be connected to a refrigerant line through which the refrigerant circulates.

In addition, in the integrated thermal management module for a vehicle according to an embodiment of the present disclosure, each of the radiator 210 and the outdoor condenser 220 is positioned on a flow path formed in the inside space of the heat exchanging duct 200. Air that has entered the flow path of the heat exchanging duct 200 may exchange heat with the coolant or the refrigerant while passing through the radiator 210 or the outdoor condenser 220.

Specifically, in the integrated thermal management module for a vehicle according to an embodiment of the present disclosure, the refrigerant storage includes a reservoir 420 and an accumulator 405, and the refrigerant circulation part includes a chiller 430, a pump, a valve, and a compressor 410. The reservoir 420, the accumulator 405, the chiller 430, the pump, the valve, and the compressor 410 may be integrated into a module so as to be positioned on a side of the cooling/heating duct 100 and the heat exchanging duct 200. In this manner, the overall height may be reduced.

The integrated thermal management module for a vehicle according to an embodiment of the present disclosure having the above-described configuration can manage indoor air condition for the vehicle and improve heat efficiency by realizing the cooling and heat pump systems for electronics, such as the battery and the electric drive unit, of the vehicle. In addition, since the components for such purpose are integrated and positioned on top of the vehicle underbody, the space utilization of the cabin room on top of the underbody may also be maximized.

In addition, the housing 300 of the integrated thermal management module is disposed on the cross member 20 positioned in the front part of the vehicle. Here, the cross member 20 on which the housing 300 is disposed may be positioned in front of the front wheels 15 of the vehicle.

In addition, the refrigerant storage and the refrigerant circulation part 400 of the integrated thermal management module for a vehicle according to an embodiment of the present disclosure may be provided on sides of the cooling/heating duct 100 and the heat exchanging duct 200, in particular, inside or outside the side frames 10 of the vehicle underbody.

Because the integrated thermal management module is disposed on the cross member 20 connecting the side frames 10 of the vehicle, the integrated thermal management module may be advantageously fitted to any position of the vehicle underbody. In particular, when the integrated thermal management module is positioned in front of the front wheels of the vehicle, it is advantageously possible to secure the ease of air circulation and maximize the space of the cabin room.

Furthermore, both the refrigerant storage and the refrigerant circulation part 400 for vehicle indoor heating and vehicle thermal management may be provided as a module mounted on side portions of the cooling/heating duct 100 and the heat exchanging duct 200, thereby realizing a compact assembly process and a compact circuit configuration. The lengths of the coolant line and the refrigerant line may also be minimized.

In particular, since the heat exchanging duct 200 is provided in the lower part of the housing 300 and the cooling/heating duct 100 is provided in the upper part of the housing 300 as illustrated in FIGS. 1 and 4, the upper part of the single housing 300 can easily provide conditioned air to the adjacent indoor space, and the lower part of the single housing 300 can perform heat exchange with external air as required. Accordingly, thermal management can be sufficiently performed by the sample flow path configuration in the housing 300 having the minimum space.

Although the exemplary embodiments of the present disclosure have been described for illustrative purposes, those having ordinary skill in the art should appreciate that various modifications, additions, and substitutions are possible, without departing from the scope and spirit of the present disclosure.

What is claimed is:

1. A thermal management module for a vehicle, the thermal management module comprising:
   a housing disposed on a cross member between side frames arranged on sides of an underbody of the vehicle on which wheels are positioned, wherein the housing comprises a cooling/heating duct connected to an upper body of the vehicle, and a heat exchanging duct connected to an outside of the vehicle;
   a cooling/heating heat exchanger and an outdoor heat exchanger disposed on the cooling/heating duct and the heat exchanging duct of the housing, respectively; and
   a refrigerant storage and a refrigerant circulation part provided on sides of the cooling/heating duct and the heat exchanging duct of the housing, respectively.

2. The thermal management module of claim 1, wherein the cross member comprises: a base extending in a lateral direction of the vehicle, and coupling portions provided on ends of the base, the coupling portions being coupled to the side frames to connect the side frames to each other.

3. The thermal management module of claim 2, wherein the housing is disposed on a top region of the base of the cross member, and the coupling portions are bending parts of the ends of the base of the vehicle so as to be supported on and coupled to side and top regions of the side frames, respectively.

4. The thermal management module of claim 1, wherein the cooling/heating heat exchanger comprises: a vaporization core for indoor cooling, and a condensing core for indoor heating,
   wherein the vaporization core and the condensing core are connected to a refrigerant line on which a compressor and an expansion valve are provided, such that refrigerant circulates.

5. The thermal management module of claim 4, further comprising:
   a mix door provided between the vaporization core and the condensing core and configured to selectively open and close the vaporization core and the condensing core,
   wherein, when the mix door is closed, air that has passed through the vaporization core bypasses the condensing core to enter an indoor space of the vehicle, and when the mix door is opened, air that has passed through the vaporization core passes through the condensing core to enter the indoor space of the vehicle.

6. The thermal management module of claim 1, wherein the outdoor heat exchanger comprises: a radiator in which coolant circulates, and an outdoor condenser in which refrigerant circulates,
   wherein the radiator is connected to a coolant line through which the coolant circulates, and the outdoor condenser is connected to a refrigerant line through which the refrigerant circulates.

7. The thermal management module of claim 6, wherein the radiator and the outdoor condenser are positioned in a flow path provided in an inside space of the heat exchanging duct,
   wherein air that has entered the flow path of the heat exchanging duct exchanges heat with the coolant or the refrigerant while passing through the radiator or the outdoor condenser.

8. The thermal management module of claim 1, wherein the refrigerant storage comprises: a reservoir, and an accumulator,
   wherein the refrigerant circulation part comprises: a chiller, a pump, a valve, and a compressor, and
   wherein the reservoir, the accumulator, the chiller, the pump, the valve, and the compressor are integrated into a module so as to be positioned along a side of the cooling/heating duct or the heat exchanging duct.

9. The thermal management module of claim 1, wherein the housing is disposed on the cross member positioned in a front part of the vehicle, and the cross member is positioned in front of front wheels of the vehicle.

10. The thermal management module of claim 1, wherein the refrigerant storage and the refrigerant circulation part are provided on sides of the cooling/heating duct and the heat exchanging duct to be positioned inside or outside the side frames of the underbody.

\* \* \* \* \*